US005148975A

United States Patent [19]

Dickerson et al.

[11] Patent Number: 5,148,975

[45] Date of Patent: Sep. 22, 1992

[54] TRASH RECEPTACLE TRAY SUPPORT AND METHOD FOR EMPTYING TRAY

[75] Inventors: Jon E. Dickerson, Murray; James E. Millburn, West Jordan, both of Utah

[73] Assignee: Zeit Company, Salt Lake City, Utah

[21] Appl. No.: 753,871

[22] Filed: Sep. 3, 1991

[51] Int. Cl.[5] ........................ B65G 11/04; B65D 43/26

[52] U.S. Cl. ........................................ 232/44; 414/421; 220/263; 99/644

[58] Field of Search .................. 232/44; 220/908, 263; 99/644, 646 R; 414/419, 421

[56] References Cited

U.S. PATENT DOCUMENTS

| | | | |
|---|---|---|---|
| 1,988,318 | 1/1935 | King | 220/908 |
| 2,170,677 | 8/1939 | Berg | 232/44 |
| 3,155,314 | 11/1964 | Kreider | 232/44 |
| 3,204,740 | 9/1965 | Legault | 232/44 |
| 4,117,777 | 10/1978 | Schipman | 232/44 |
| 4,609,122 | 9/1986 | Ziegenbein . | |
| 4,729,490 | 3/1988 | Zeigenbein . | |
| 4,782,970 | 11/1988 | Edwards | 220/908 |
| 4,878,590 | 11/1989 | Porter . | |
| 5,011,026 | 4/1991 | Hausman | 220/908 |

FOREIGN PATENT DOCUMENTS

| | | | |
|---|---|---|---|
| 473199 | 10/1937 | United Kingdom | 220/908 |

*Primary Examiner*—Renee S. Luebke
*Assistant Examiner*—F. Saether
*Attorney, Agent, or Firm*—David R. Black

[57] ABSTRACT

A trash receptacle tray support configured and capable of supporting a tray for use in emptying contents of a tray into a trash receptacle. A tray support having a hinged attachment for pivoting a supported tray toward a trash receptacle so that trash is directed into a trash receptacle. A method of emptying trash into a trash receptacle from a tray by use of a pivoting trash receptacle tray support with directing means for guiding trash into a trash receptacle.

10 Claims, 4 Drawing Sheets

TRASH RECEPTACLE TRAY SUPPORT AND METHOD FOR EMPTYING TRAY

BACKGROUND OF THE INVENTION

This invention relates to a device to assist in the emptying of trash from a tray into a trash receptacle. At most fast food restaurants, cafeterias and other food service locations it is necessary for patrons to carry trays of food and drink to their tables. It is also necessary for the patrons or others to carry the trays filled with trash to a trash receptacle for disposal. The trash receptacles often have doors which must be opened before the trash can be emptied in the trash receptacle. This is cumbersome for people carrying bags, children, brief cases, back packs, two trays or for people who may only have the use of one hand for whatever reason. An object of this invention is to provide a simple, inexpensive, and easy to use device which can alleviate the problems described above and assist people in emptying trays into trash receptacles. A further object of this invention is to provide an inexpensive support for a tray which can be used to assist a person in emptying trash into a trash receptacle. A further object of this invention is to provide a simple device which can be molded directly into a trash receptacle or can be retrofitted to existing trash receptacles quickly and easily. A further object of this invention is to provide a sanitary way to dispose of trash on a tray without the need for a patron to touch the trash receptacle.

BRIEF SUMMARY OF THE INVENTION

A tray support is attached to a trash receptacle and is configured to allow a tray to rest on a tray support platform. The tray support is hingedly attached to the trash receptacle in a way that as a tray is lifted in the tray support, the trash is directed into the trash receptacle. The tray support is further configured to assist in opening a door to the trash receptacle. The door of the trash receptacle then helps to push the tray support back into its resting position.

DETAILED DESCRIPTION OF THE PREFERRED EMBODIMENT

Figure 1:
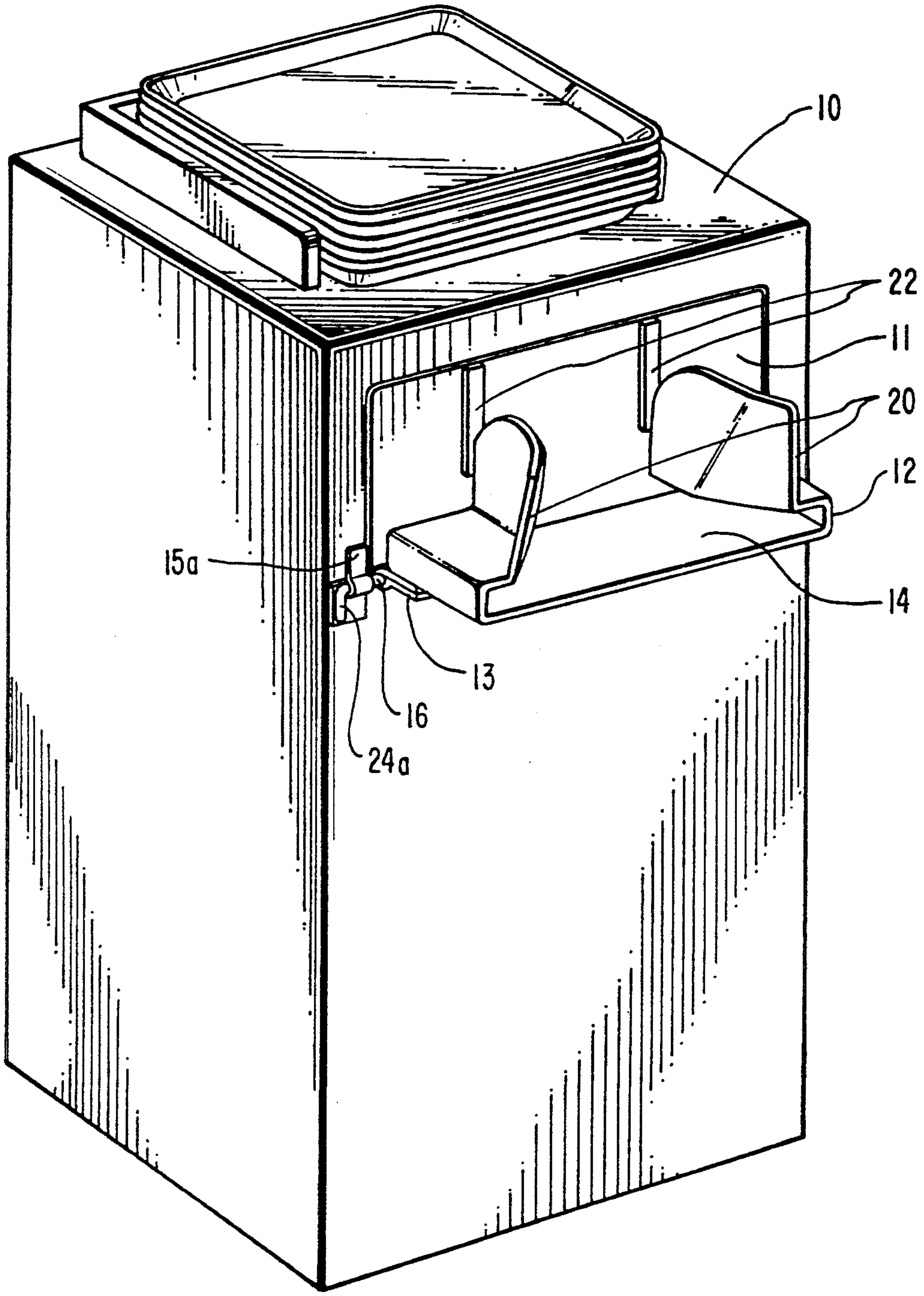
FIG. 1 illustrates a trash receptacle with a door and a tray support attached to the trash receptacle.

Referring to FIG. 1, a trash receptacle 10 is shown. Trash receptacles of the kind shown are common in fast food restaurants, shopping malls, convenience stores and other locations where trays are commonly used. In many cases, trash receptacles have one or more hinged doors 11 which must be opened in order to empty trash into a trash receptacle. It is often difficult for a person carrying a tray to open a door to a trash receptacle and empty trash into a trash receptacle without spilling the tray. It becomes necessary to set down things being carried or try to empty the tray using only one hand. This invention solves this problem by use of a tray support 12 which is attached to a trash receptacle 10 by means of hinged attachment 13. Said tray support 12 is comprised of a horizontal tray platform 14 on which a tray (not shown) can rest. In the preferred embodiment, said hinged attachment 13 is comprised of plastic or other sturdy material which is attached to said tray support 12 and to said trash receptacle 10 by an attaching means 15*a* and 15*b*. Said attaching means 15*a* and 15*b* are configured to hold a bar 16 which is positioned within said hinged attachment 13. Said bar extends laterally outside said hinged attachment and is positioned within attaching means 15*a* and 15*b* in such a way to enable said hinged attachment to pivot about said bar. To make the invention easier to use, said tray platform 14 may also include directing means 20 which can act to direct trash on a tray into a trash receptacle by guiding trash toward the middle of a door on a trash receptacle.

Figure 2:
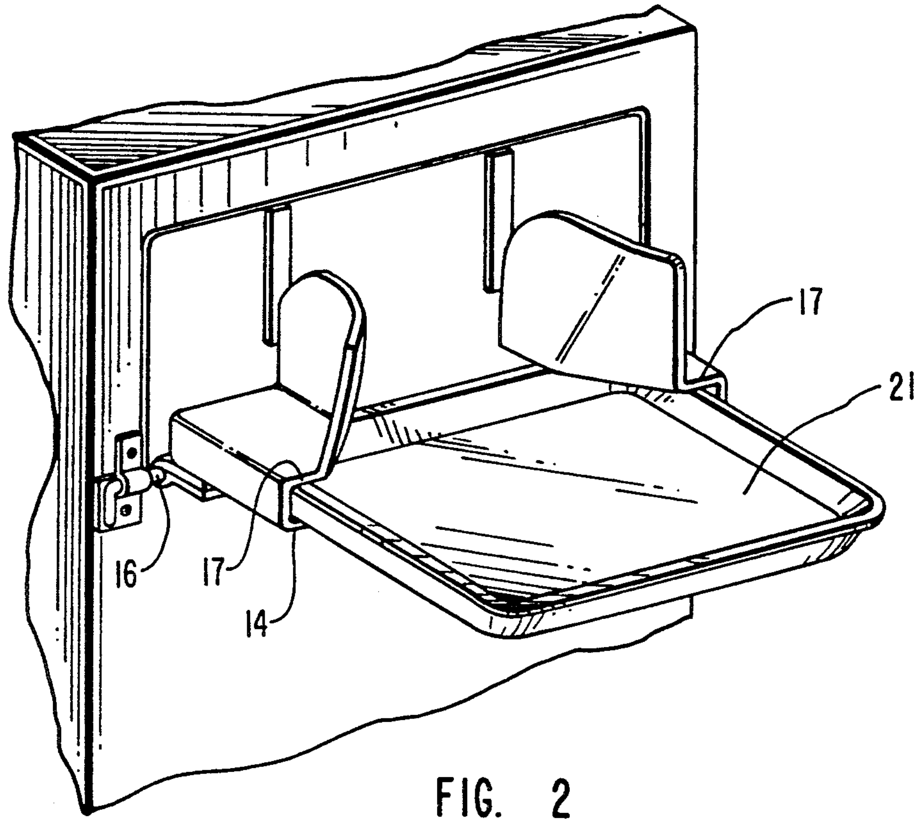
FIG. 2 illustrates a tray in a tray support and further illustrates the directing means for trash.

Referring to FIG. 2 a tray 21, not claimed, is shown resting on the tray platform 14. Said tray platform has a front (the edge furthest from the trash receptacle) a rear (the edge closest to the trash receptacle) and two sides. Trays are commonly used in fast food and other food service locations. In many instances the trays are a standard rectangular size. The size of a typical rectangular tray is 16½" wide in the wider rectangular dimension by 12" in the narrower dimension and approximately 1" deep. This invention, however, can be modified for smaller trays or for larger trays such as those used in school cafeterias and other places. In the preferred embodiment, the tray platform is 17" wide by 5" from front to back and 1" deep. The tray platform is sized to support a tray and can have different dimensions. Said hinged attachment 13 is approximately as wide as said tray platform but can be in any configuration which allows said tray support to pivot. In one embodiment, said bar is approximately 21½" long and extends past the side of the hinged attachment to a distance sufficient to attach to a trash receptacle.

It is desirable to enable the person emptying trash from a table to lift and tilt a tray toward a trash receptacle by using only one hand. This can be accomplished by including on said tray support 12 a limiting means to hold a tray 21 while the person is lifting and/or tilting the tray toward the trash receptacle. In the preferred embodiment, said limiting means is a lip 17 on the tray support. Said lip is configured on both sides of said tray platform to curve around a tray placed on said tray platform. Said lip 17 is raised a distance from said tray platform to allow a tray to fit between said tray platform 14 and said lip 17. In use, a tray 21 is placed on said tray platform 14. Said lip 17 extends over the edge of the tray on each side of said tray platform. Thus, as a person lifts or tilts a tray, the lip 17 comes into contact with the edge of a tray. In this way, the entire tray support 12 is pivoted about the bar 16 and tilts toward the trash receptacle, when the tray is lifted.

Figure 3:
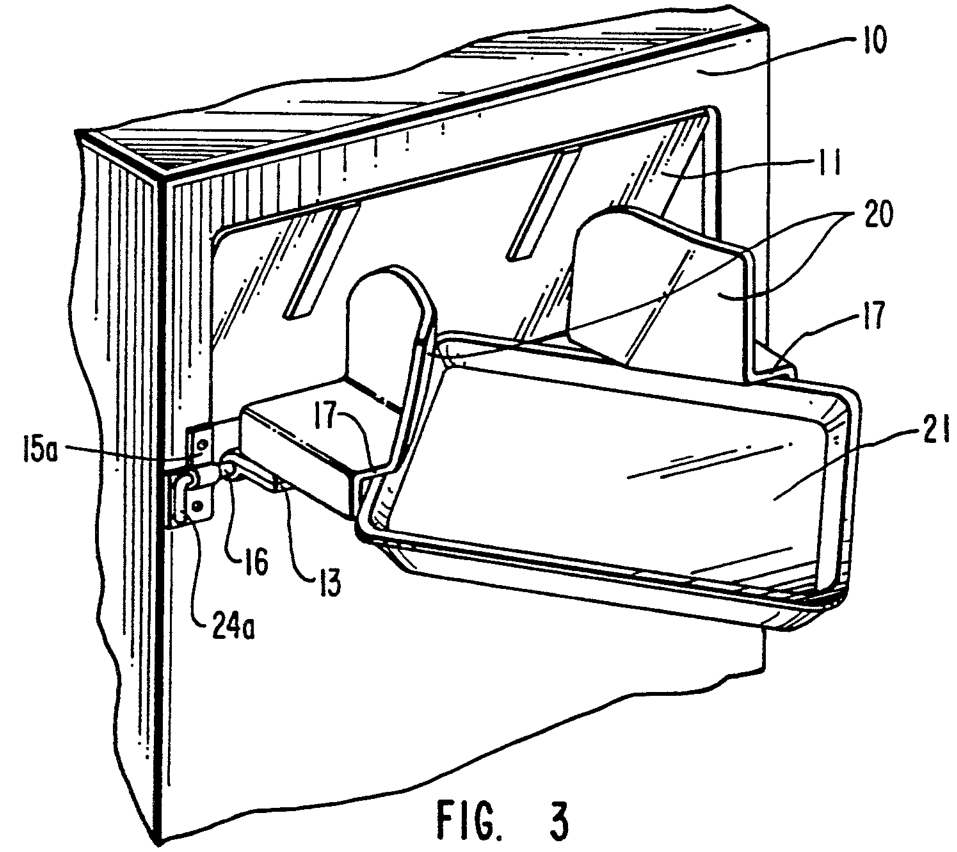
FIG. 3 illustrates a tray in a tray support in another position.
Figure 4:
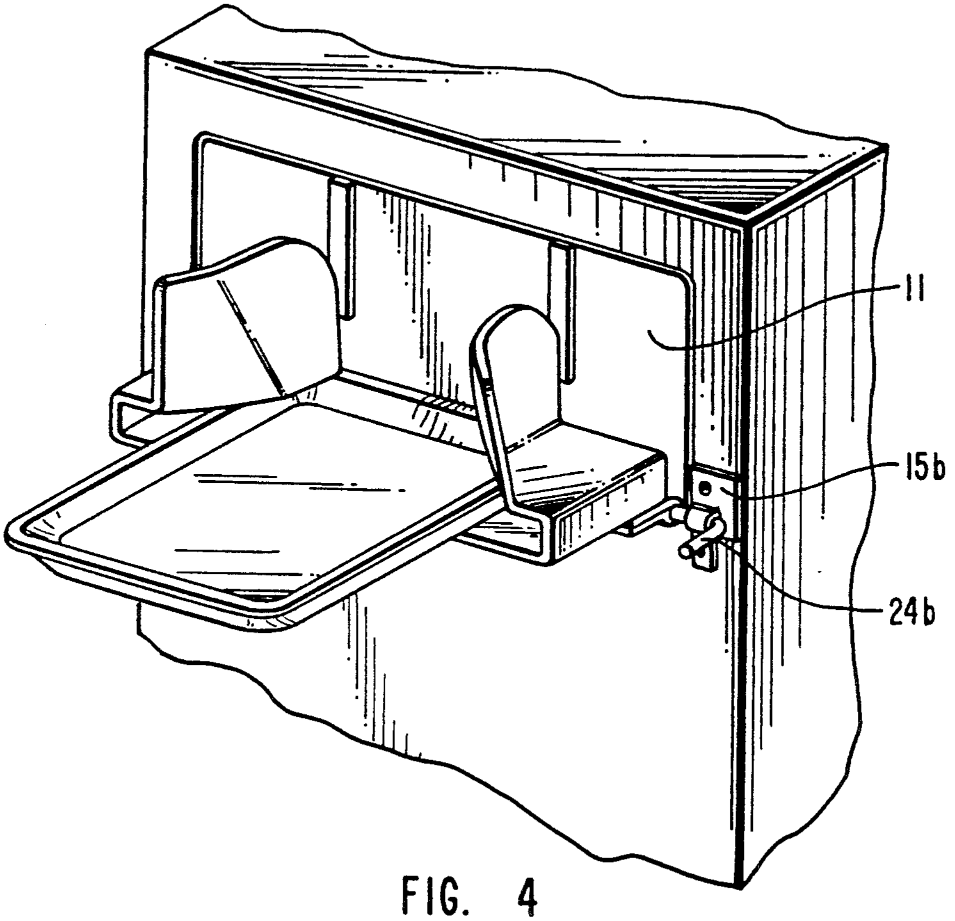
FIG. 4 illustrates a tray in a tray support in another position.
Figure 7:
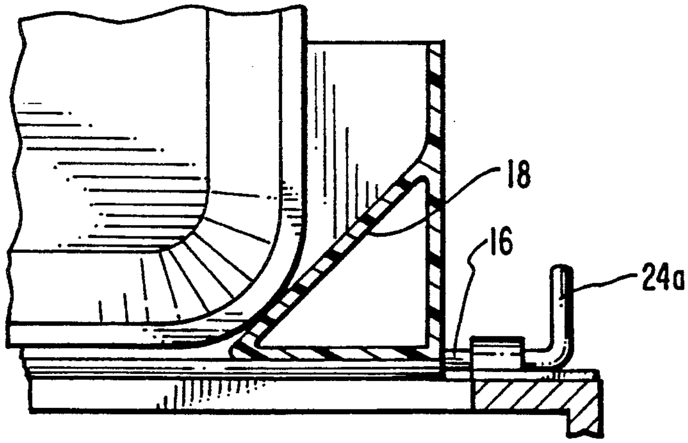
FIG. 7 illustrates a tray against a tray stop.

Without the use of this invention, when someone loses grip on a tray while emptying it into the trash receptacle, the tray is often dropped into the trash receptacle. This is not desirable. In the preferred embodiment, the trays are kept from entering the trash receptacle by use of a tray stop 18 as shown in FIG. 7. Said tray stop 18 is configured and positioned to keep a tray 16 from sliding through the tray support and into the trash receptacle. The tray stop 18 is positioned near the rear (or receptacle side) of the tray support 12. Said tray stop 18 is configured to allow the tray to be positioned on the tray platform in any position as shown in FIGS. 2, 3 and 4. A tray can be introduced onto the tray platform sideways, lengthwise or diagonally as shown. The tray stop 18 is positioned and sized to stop a tray 16 from going any further toward the rear (or receptacle side) of said tray support. As shown in FIG. 7, in the preferred embodiment, said tray stop 18 comprises at least one angled insert 18 situated on the tray support near the rear (or receptacle side) of said tray support 12. In the preferred embodiment, two tray stops 18 are affixed to said tray platform 14. Said tray stops 18 could be attached to the lip 17 or to the directing means 20. Other embodiments of tray stops 18 could be used to keep the tray from entering a trash receptacle. Other tray stops could include protrusions from the bottom of the tray platform, protrusions from the underside of the lip 17, or other extensions from said diverting means 20 capable of preventing a tray from sliding off said tray platform and into a trash receptacle. In another embodiment, the tray stop could be made by narrowing the dimensions between said tray platform and said lip to prevent a tray from entering into a trash receptacle. In the preferred embodiment, the tray stops 18 are small angled pieces of sturdy material. Said tray stops 18 are angled toward the rear of the tray platform to allow food and drink to be directed toward the trash receptacle should they be spilled onto the tray platform.

Directing means 20 are attached to the tray support to direct trash into a trash receptacle. In the preferred embodiment, the directing means 20 are two approximately vertical flanges attached to said tray support 12. In the preferred embodiment, said directing means 20 are molded directly into said lip 17 which extends up and over said tray platform as shown in FIG. 1. Said directing means 20 are angled toward the center and rear of said tray support and are arranged to direct trash toward a door on a trash receptacle. Said directing means 20 can be any arrangement which assists in steering trash on a tray toward a door to a trash receptacle. In the preferred embodiment, said directing means are two flanges approximately 5½" high and made of a sturdy material.

As an added advantage, said directing means 20 can also act as an opening means for opening a door of a trash receptacle. Other opening means could be used, but the preferred embodiment makes use of said directing means 20 for convenience in manufacturing and cleaning. Said opening means need to be positioned to come into contact with a door 11 of a trash receptacle 10 when said tray support 12 is lifted or tilted to empty trash into a trash receptacle. Said opening means push against a door and open it to allow trash to be emptied into a trash receptacle. When a tray in the tray support is lowered, the door of trash receptacle is allowed to reclose. Some doors on trash receptacles are spring loaded to close after use. The spring action of such a door can also help to return said tray support 12 to its original position for use by the next person. Door guards 22 can be added to the door of the trash receptacle at the location where said opening means contact the door when in use. In the preferred embodiment, the door guards 22 are strips of plastic or other protective material which are affixed to the door. Door guards may be attached to existing trash receptacle doors or constructed directly onto the doors at the time of manufacture.

Figure 5:
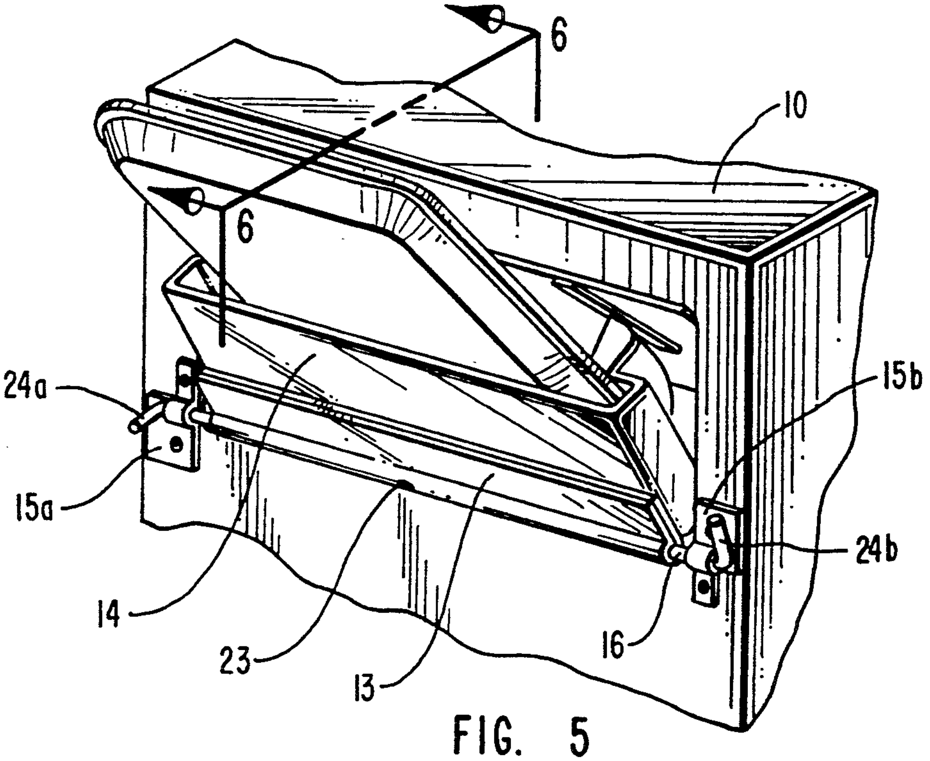
FIG. 5 illustrates a tray in a tray support in the lifted position for emptying trash into the receptacle. Also shown is the hinged attachment to the trash receptacle as well as hinge guards.

Said tray support 12 is hingedly attached to a trash receptacle by means of a hinged attachment 13. In the preferred embodiment, the hinged attachment 13 is used by employing a bar 16 to said tray platform 14 through the hinged attachment 13. Said bar is positioned adjacent to said tray platform 14. Said bar 16 has a left end and right end and is sized so that the two ends extend past sides of said tray platform as shown in FIG. 5. Said hinged attachment 13 is constructed of plastic or a sturdy material and enfolds said bar 16. Said hinged attachment is attached to the bottom or underside of said tray platform thus securing said hinged attachment 13 to said tray support 12. In another embodiment, said hinged attachment 13 can be constructed directly into said tray platform 14 at the time of manufacture. Said bar 16 is fixed within said hinged attachment by means of at least one set screw 23. Said bar 16 has two ends (a left end and a right end when facing the trash receptacle). Said bar 16 is then placed within said attaching means 15*a* and 15*b* which attach said hinged attachment 13 to a trash receptacle 10. Said bar 16 is configured to stop said tray support 12 from pivoting too far in either the up or down direction by a stopping means. In the preferred embodiment, said stopping means comprises bar extensions 24*a* and 24*b* on the left end and right end of said bar respectively. On the left end of said bar 16, said bar extension 24*a* points downward. Said left end bar extension 24*a* is configured to keep said tray support 12 from pivoting too far in the downward position. In its normal, unused position, said left end bar extension 24*a* comes into contact with a trash receptacle thus preventing said tray support 12 from pivoting downward. At the other (or right) end of said bar 16, said right end bar extension 24*b* is extended outward away from a trash receptacle. Said right end bar extension 24*b* is configured so that when said tray support is pivoted up to empty trash from a tray, said right end bar extension 24*b* comes into contact with a trash receptacle and prohibits said tray support 12 from pivoting any further upward. In the preferred embodiment, said bar extensions 24*a* and 24*b* come into contact with said attaching means 15*a* and 15*b*. However, different configurations could be used to have hinge guards replace said attaching means as a way of protecting a trash receptacle from constant use. Said attaching means are configured to protect a trash receptacle from constant wear by said bar extensions 24*a* and 24*b* in the preferred embodiment and act as a means to attach said bar 16 to a trash receptacle. Said attending means 15*a* and 15*b* are affixed to a trash receptacle by means of screws 26. Said attaching means could be molded directly into a trash receptacle, glued on to an existing trash receptacle or affixed in some other way.

The entire tray support 12 can be manufactured in a number of ways. The tray support 12 can be molded out of plastic by a vacuum forming, thermo molding or other means to prepare a plastic assembly. In the preferred embodiment, said tray support 12 is constructed out of molded plastic to aid in cleaning and use of said tray support.

Figure 6:
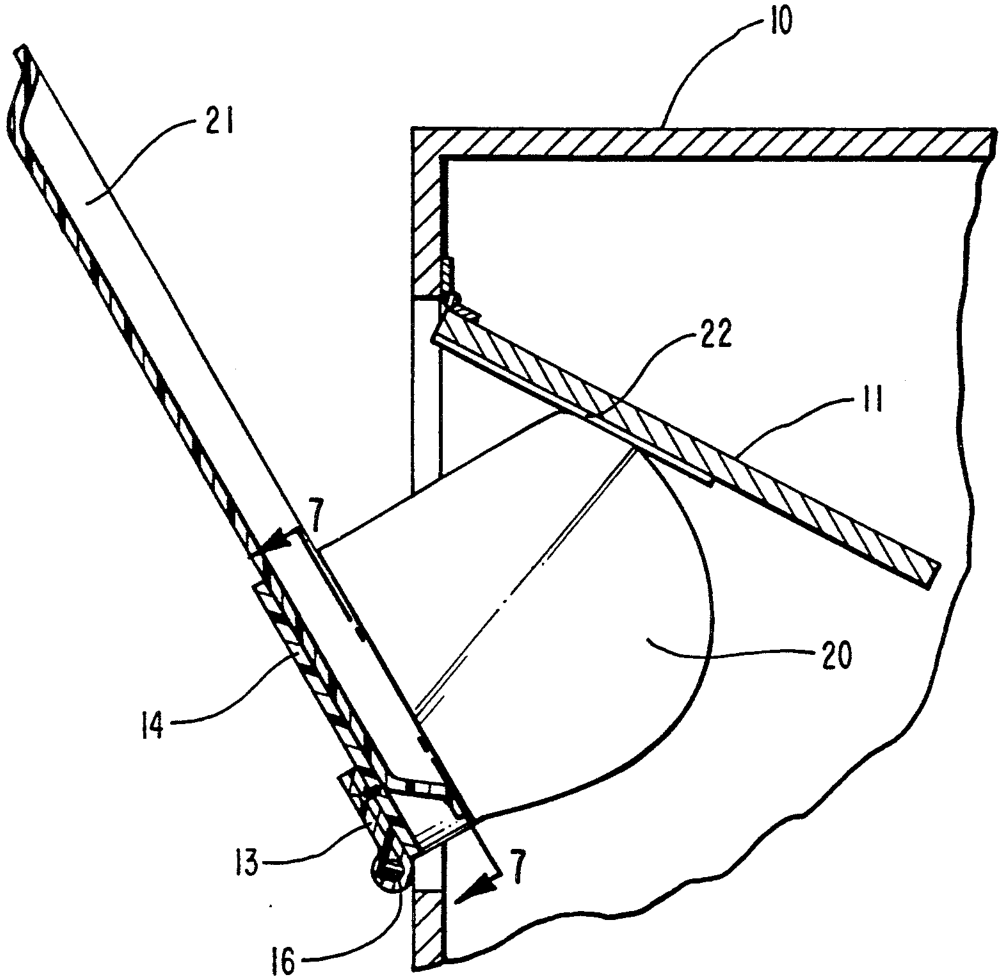
FIG. 6 illustrates in cross section a tray in a tray support. Shown are a lip and tray stop as well as the directing means contacting the door of a trash receptacle.

FIG. 6 shows the inventive tray support in use. A tray 21 has been placed on said tray platform 14 and is situated under lip 17. The tray is lifted thus pivoting said tray support 12 above said hinged attachment 13 and bar 16. Said directing means 20 have contacted a door 11 of trash receptacle and pushed open the door. This allows trash from a tray to enter a trash receptacle.

While the invention has been described with reference to specific preferred embodiments, the description is illustrative of the invention and is not to be considered as limiting the invention. Various modifications and applications may occur to those skilled in the relevant art without departing from the true spirit and scope of the invention as defined by the appended claims.

We claim:

1. A trash receptacle tray support comprising (a) a tray platform adapted to support a tray, (b) a means for attaching said tray platform to a trash receptacle, (c) a means for emptying contents of a tray into a trash receptacle;

wherein said tray platform further comprise a means for directing trash into a trash receptacle, and wherein said tray platform further comprises a means for limiting the movement of a tray wherein said limiting means comprises a lip wherein said directing means are configured to open a trash receptacle door.

2. A trash receptacle tray support in accordance with claim 1 wherein said directing means are flanges.

3. A trash receptacle tray support in accordance with claim 2 wherein said tray platform attaching means is adapted to pivot said tray support toward the trash receptacle.

4. A trash receptacle tray support in accordance with claim 2 wherein said directing means are configured to push open a trash receptacle door.

5. A trash receptacle tray support in accordance with claim 2 wherein said flanges are angled toward the center of the trash receptacle.

6. A trash receptacle tray support in accordance with claim 5 wherein said tray platform attaching means is adapted to pivot said tray support toward the trash receptacle.

7. A trash receptacle tray support in accordance with claim 5 wherein said limiting means further comprises a tray stop.

8. A trash receptacle tray support in accordance with claim 1 wherein said tray platform attaching means is adapted to pivot said tray support toward the trash receptacle.

9. A trash receptacle tray support in accordance with claim 8 wherein said limiting means further comprises a tray stop.

10. A trash receptacle tray support in accordance with claim 1 wherein said limiting means further comprises a tray stop.

* * * * *